United States Patent
Chen et al.

(10) Patent No.: US 8,356,919 B2
(45) Date of Patent: Jan. 22, 2013

(54) LENS AND LED MODULE USING THE SAME

(75) Inventors: Chin-Chung Chen, Taipei Hsien (TW); Shi-Yu Song, Shenzhen (CN)

(73) Assignees: Fu Zhun Precision Industry (Shen Zhen) Co., Ltd., Shenzhen (CN); Foxconn Technology Co., Ltd., New Taipei (TW)

( * ) Notice: Subject to any disclaimer, the term of this patent is extended or adjusted under 35 U.S.C. 154(b) by 539 days.

(21) Appl. No.: 12/686,324

(22) Filed: Jan. 12, 2010

(65) Prior Publication Data
US 2011/0128745 A1      Jun. 2, 2011

(30) Foreign Application Priority Data
Nov. 30, 2009   (CN) .......................... 2009 1 0310690

(51) Int. Cl.
*F21V 3/00*    (2006.01)
*F21V 5/00*    (2006.01)

(52) U.S. Cl. .................................. 362/311.02; 362/800
(58) Field of Classification Search ............. 362/249.02, 362/311.02, 800
See application file for complete search history.

(56) References Cited

U.S. PATENT DOCUMENTS
8,083,380 B2 * 12/2011 Zhou ......................... 362/311.02
2007/0152231 A1 * 7/2007 Destain ........................... 257/99

* cited by examiner

*Primary Examiner* — Jason Moon Han
(74) *Attorney, Agent, or Firm* — Altis Law Group, Inc.

(57) ABSTRACT

An LED module includes a printed circuit board, an LED mounted on the printed circuit board, and a lens fixed on the printed circuit board and covering the LED for refracting light emitted by the LED. The lens has a concaved inner face for incidence of the light and an opposite convex outer face for the light refracting out thereof. The inner face is aspherical. The outer face is spherical. The inner and outer faces are centrosymmetrical relative to axes, respectively, which are coincident with each other. A curvature of the inner face is gradually reduced from a center to an edge thereof.

7 Claims, 4 Drawing Sheets

LENS AND LED MODULE USING THE SAME

BACKGROUND

1. Technical Field

The present disclosure relates generally to an LED module, and more particularly to an LED module for lighting and a lens applied in the LED module.

2. Description of Related Art

LED lamp, a solid-state lighting, utilizes LEDs as a source of illumination, providing advantages such as resistance to shock and nearly limitless lifetime under specific conditions. Thus, LED lamps present a cost-effective yet high quality replacement for incandescent and fluorescent lamps.

Known implementations of LED modules in an LED lamp employ lenses for focusing white light generated by the LEDs. Due to a forming mechanism of white light generated by the LEDs, the light pattern provided by the light is prone to be yellow or shining at edges, which is not suitable for illumination.

What is need therefore is a lens and an LED module using the lens which can overcome the above limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
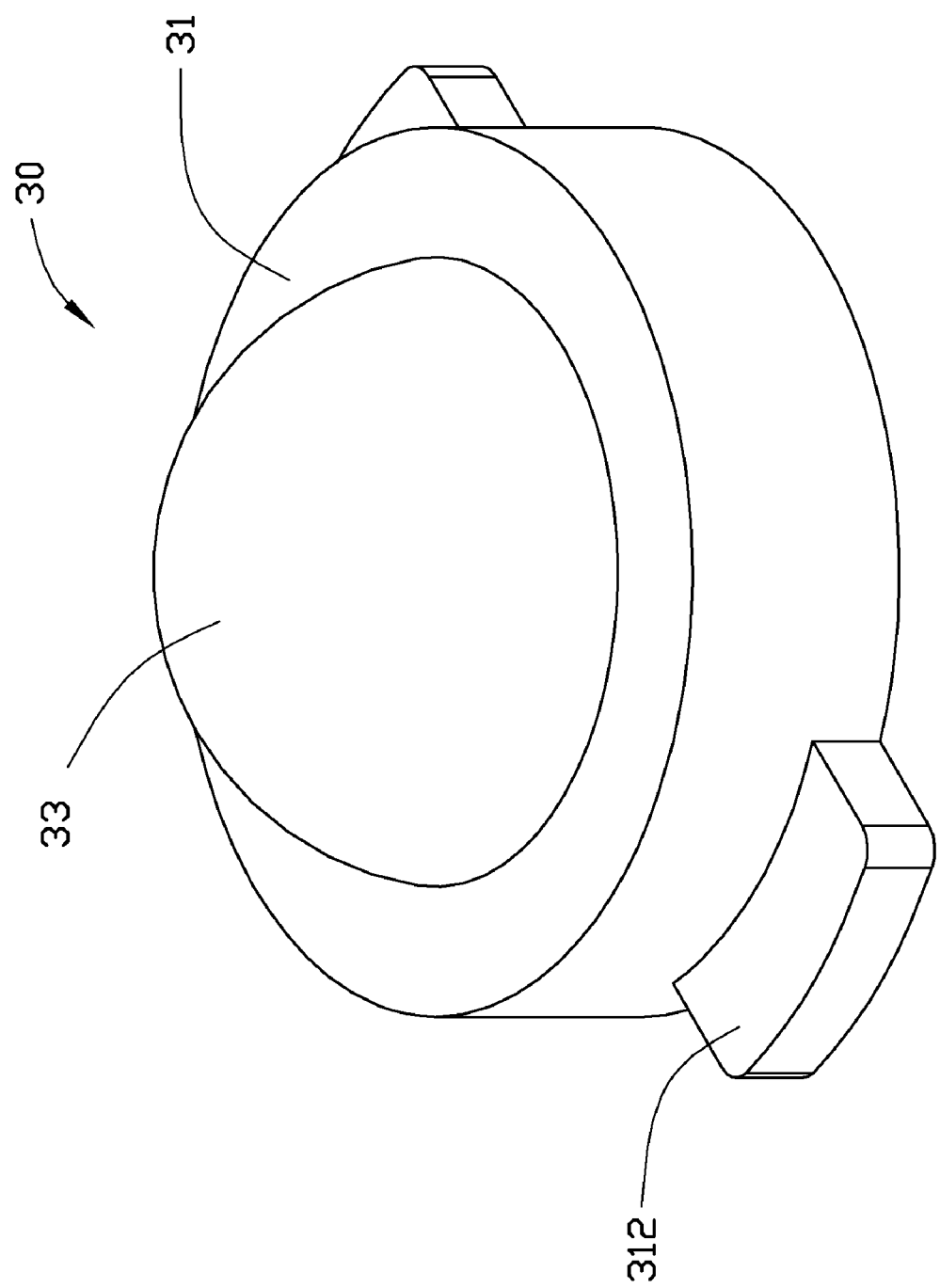
FIG. 1 is an isometric view of a lens in accordance with an embodiment of the present disclosure.
Figure 2:
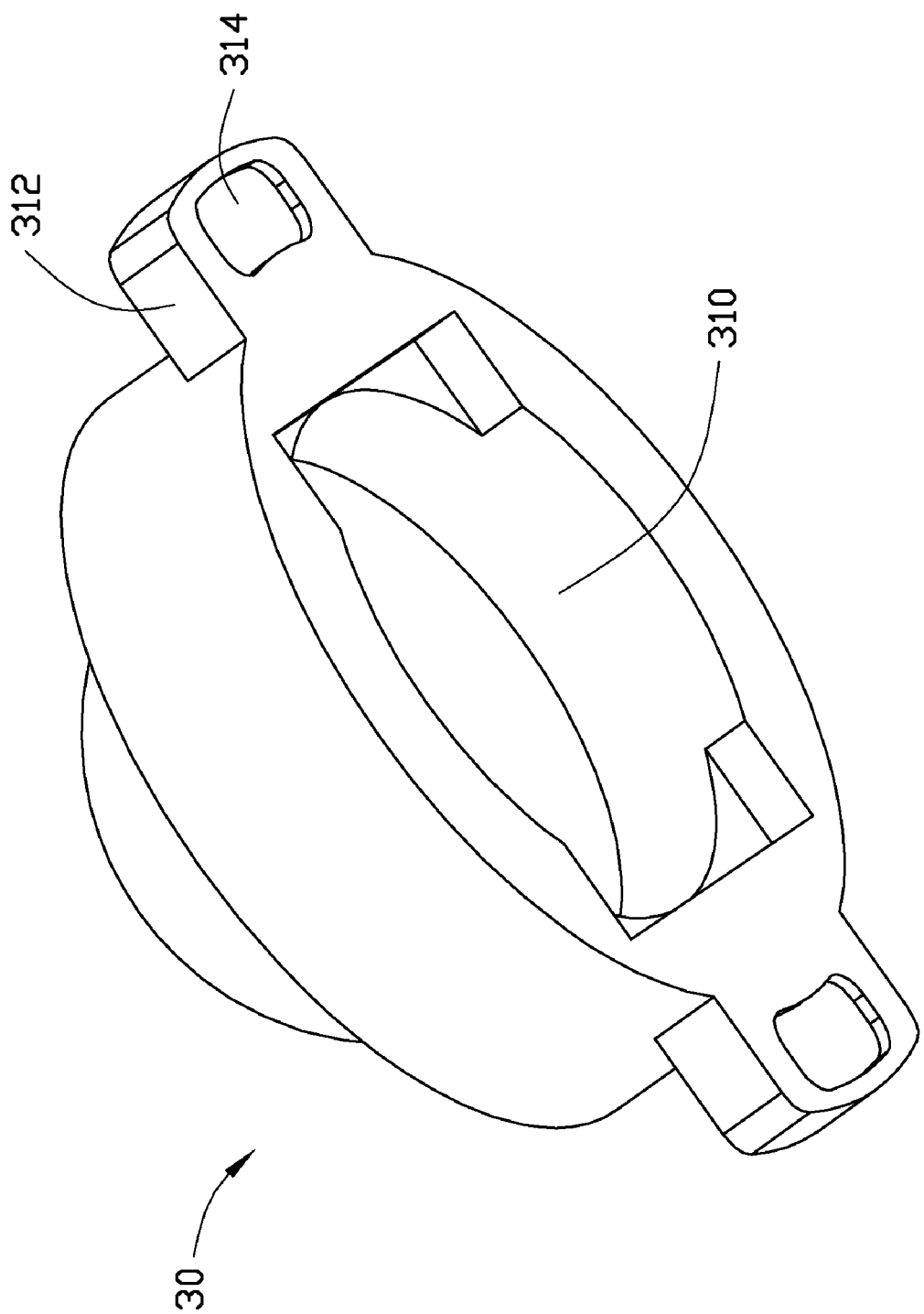
FIG. 2 is a view similar to FIG. 1, but shown from a different aspect.
Figure 3:
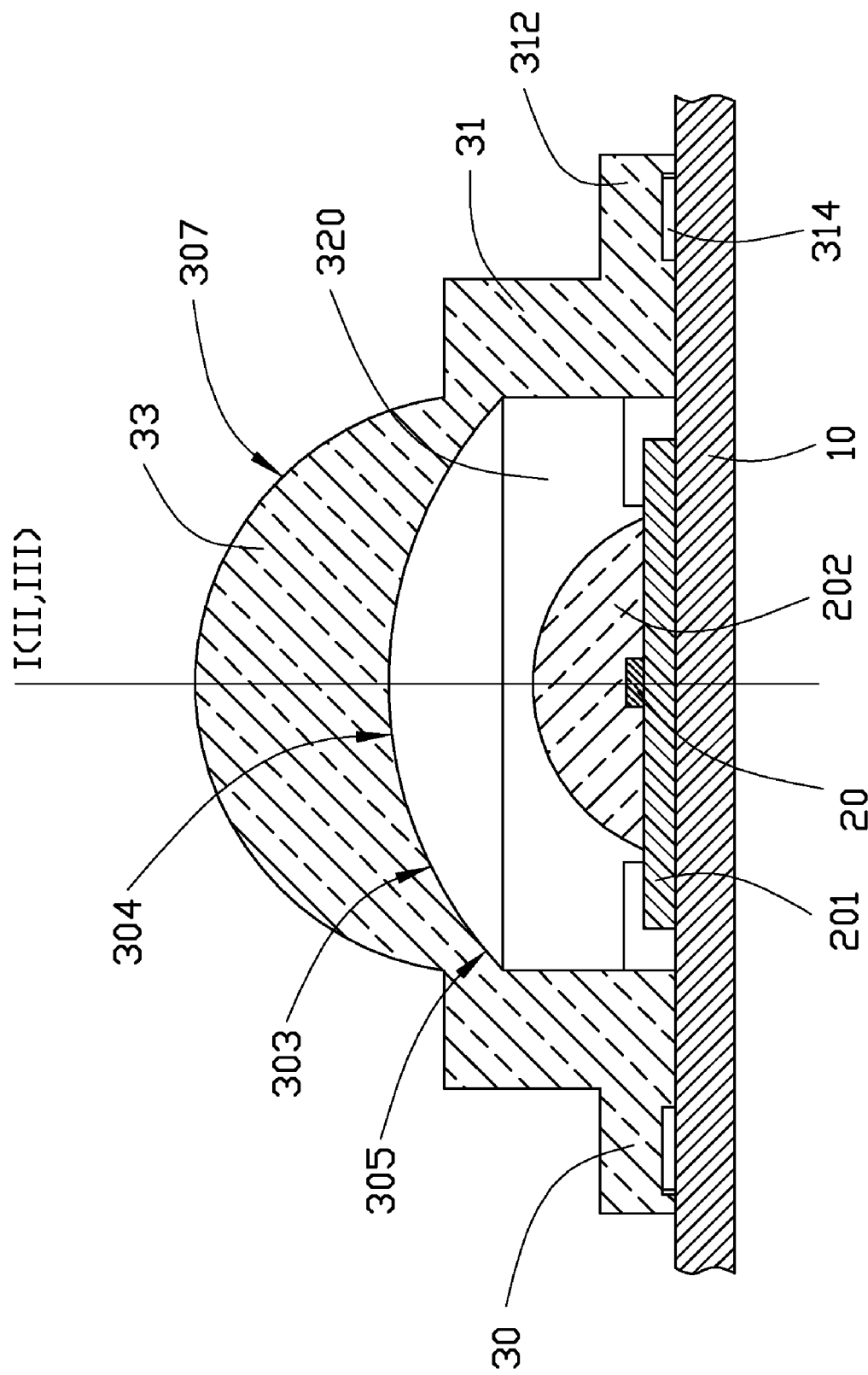
FIG. 3 is a cross-sectional view of an LED module with the lens of FIG. 1.

FIG. 3 illustrates, in cross section, an LED module in accordance with an embodiment of the present disclosure. The LED module comprises a printed circuit board 10, an LED 20 mounted on the printed circuit board 10 and a lens 30 covering the LED 20. Perspective views of the lens 30 from different aspects are shown in FIGS. 1 and 2. In detail, the LED 20 is mounted on a substrate 201 which is electrically connected to the printed circuit board 10. A semicircular encapsulant 202 is secured to the substrate 201 and covers the LED 20. The encapsulant 202 functions as a primary optical lens and a protector for the LED 20. The encapsulant 202 is made of transparent silicone. The lens 30 functions as a secondary optical lens for the LED 20.

The substrate 201 can be fixed onto the printed circuit board 10 by soldering or other means. The number of the LED 20 can be changed corresponding to a desired lighting intensity. The LED 20 has a light axis I.

The lens 30 is integrally made of a transparent material with good optical performance, such as PMMA (polymethyl methacrylate) or PC (polycarbonate). The lens 30 comprises a base 31 and a light refracting portion 33 protruding upwardly from the base 31. The base 31 is substantially disk shaped. A recess 310 is defined in a middle of a bottom of the base 31. A substantially rectangular fixing ear 312 extends from each lateral side of the base 31. Bottoms of the fixing ears 312 and the base 31 are fixed onto the printed circuit board 10. The fixing ears 312 cause the lens 30 to have a large connecting area with the printed circuit board 10, thereby making the lens 30 be more securely connected to the printed circuit board 10. Additionally, the fixing ears 312 function as a member facilitating positioning of the securement of the lens 30 to the printed circuit board 10. A fixing groove 314 is defined in a bottom of the fixing ear 312 for receiving glue or the like therein, which is used for adhering the lens 30 to the printed circuit board 10.

The light refracting portion 33 protrudes upwardly from a middle top of the base 31. The light refracting portion 33 has a concaved inner face 303 at a bottom thereof and an opposite convex outer face 307. The concaved inner face 303 is exposed to the recess 310 of the base 31. A concaved bottom surrounded by the inner face 303 of the refracting portion 33 communicates with the recess 310 to cooperatively define a receiving room 320 receiving the LED 20 therein. The inner face 303 is provided for an incidence of light generated by the LED 20, and the outer face 307 is provided for refracting the light. The inner face 303 is concaved to be aspherical and is centrosymmetrical relative to an axis II. The outer face 307 is convex to be spherical and is centrosymmetrical relative to another axis III which is coincident with the axis II. The axes II, III are also coincident with the light axis I of the LED 20 when the lens 30 covers the LED 20. Different parts of the inner face 303 have different curvatures. A curvature of a top end 304 of the inner face 303 at a center thereof is larger than that of a bottom end 305 of the inner face 303 at an edge thereof, and the curvature of the inner face 303 reduces gradually from the top end 304 (i.e., the center) to the bottom end 305 (i.e., the edge) thereof. In this embodiment, the curvature of the outer face 307 is 0.215 mm$^{-1}$. The curvature of the top end 304 (i.e., the center) of the inner face 303 is 0.26 mm$^{-1}$, and the curvature of the bottom end 305 (i.e., the edge) of the inner face 303 is 0.15 mm$^{-1}$.

Figure 4:
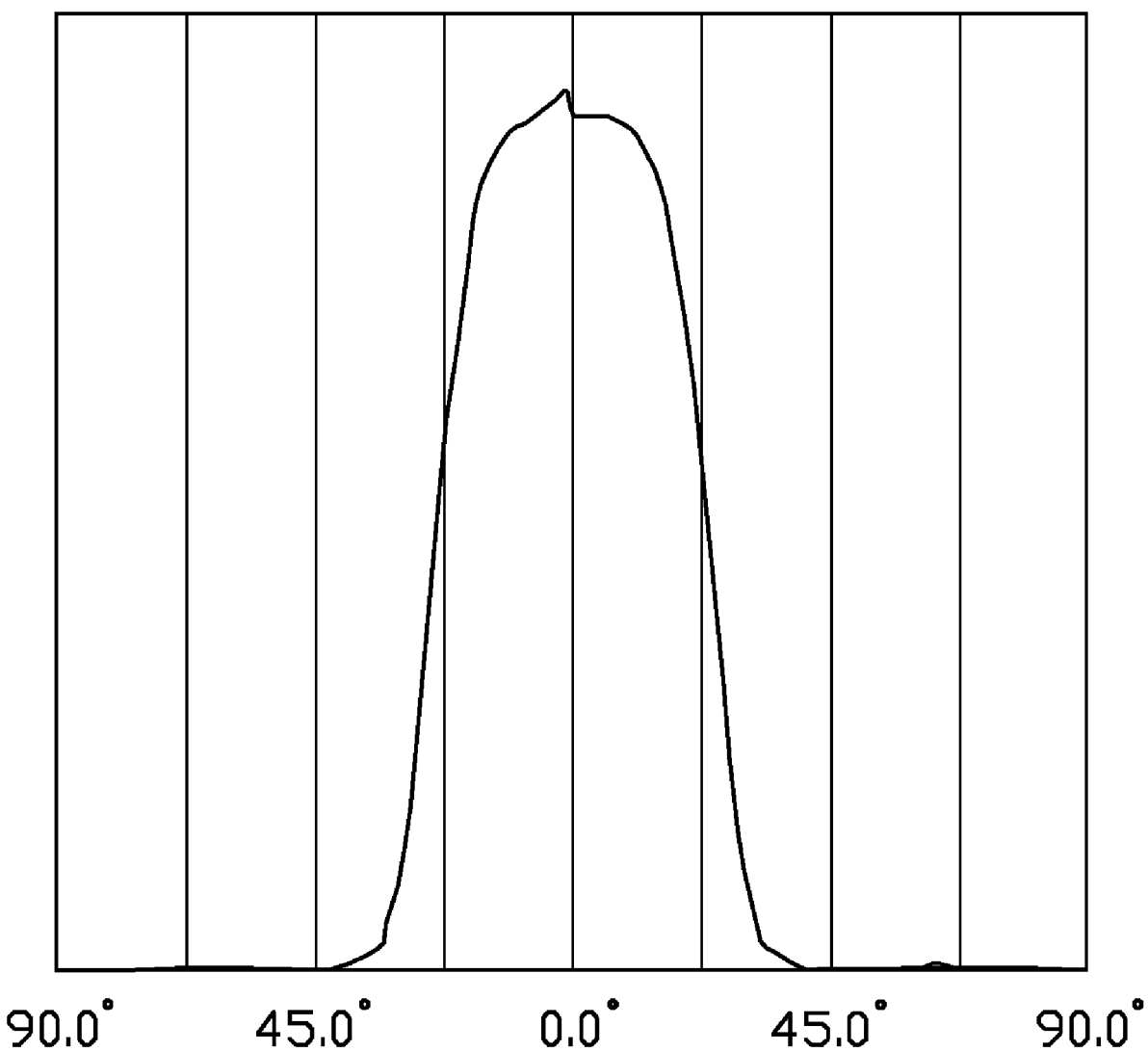
FIG. 4 is a graph of light intensity vs. angle for the LED module of FIG. 3.

FIG. 4 shows a curve of the light intensity vs. angle for the LED module in accordance with the present disclosure. After the light is refracted by the lens 30 to leave the outer face 307, most of the light, specifically, 95% of the light is located within 30 degrees off the axis I; namely, an illumination angle of the LED module is about 60 degrees. When the light off the axis I is more than about 20 degrees, the light intensity decreases sharply. The curvatures of the inner and outer faces 303, 307 can be altered in different embodiments to focus the light at different ranges such as 30 degrees or 45 degrees.

By a computer analysis, the light pattern formed by the LED module of present disclosure has a uniformly illumination. Compared with the conventional LED module, the light pattern of the present disclosure has no yellow or shining edge, which is more comfortable for users when the LED module is used for illumination application.

Understandably, according to actual requirement, a number of the LED modules can be mounted on the printed circuit board 10. The LED modules can be arranged in a matrix or circle or other shape.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens for refracting light emitted by an LED, comprising a base for receiving the LED therein and a light refracting portion protruding upwardly from the base, the light refracting portion defining a concaved inner face at a bottom thereof for incidence of the light into the light refracting portion and an opposite convex outer face at a top thereof for refracting the light out of the light refracting portion, the inner face being aspherical, and the outer face being spherical, the inner face being centrosymmetrical relative to a first axis, the outer face being centrosymmetrical relative to a second axis which is coincident with the first axis;

wherein a curvature of the inner face at a center thereof is larger than that of the inner face at an edge thereof, the curvature of the inner face is gradually reduced from the center to the edge thereof, the curvature of the center of the inner face is 0.26 $mm^{-1}$, the curvature of the edge of the inner face is 0.15 $mm^{-1}$, and the curvature of the outer face is 0.215 $mm^{-1}$.

2. The lens of claim 1, wherein a recess is defined in a middle of a bottom of the base and communicates with the bottom of the light refracting portion to cooperatively define a receiving room for receiving the LED.

3. The lens of claim 2, wherein a fixing ear extends from one of two lateral sides of the base, and a fixing groove is defined in a bottom of the fixing ear.

4. An LED module comprising:
a printed circuit board;
an LED mounted on the printed circuit board; and
a lens fixed on the printed circuit board and covering the LED for refracting light emitted by the LED, the lens having a concaved inner face for incidence of the light and an opposite convex outer face for the light refracting out thereof;
wherein the inner face is aspherical, and the outer face is spherical, the inner face being centrosymmetrical relative to a first axis, the outer face being centrosymmetrical relative to a second axis which is coincident with the first axis; and
wherein a curvature of the inner face is gradually reduced from a center to an edge thereof, the curvature of the center of the inner face is 0.26 $mm^{-1}$, the curvature of the edge of the inner face is 0.15 $mm^{-1}$, and the curvature of the outer face is 0.215 $mm^{-1}$.

5. The LED module of claim 4, wherein the lens comprises a base and a light refracting portion protruding upwardly from the base, a recess is defined in a middle of a bottom of the base and communicates with a bottom of the light refracting portion to cooperatively define a receiving room for receiving the LED.

6. The LED module of claim 5, wherein two fixing ears extend from two lateral sides of the base respectively for fixing the lens onto the printed circuit board.

7. The LED module of claim 6, wherein a fixing groove is defined in a bottom of each fixing ear for receiving glue.

* * * * *